US011282154B2

(12) United States Patent
Switzer, Sr.

(10) Patent No.: US 11,282,154 B2
(45) Date of Patent: Mar. 22, 2022

(54) DECEASED NOTIFICATION SYSTEM AND METHOD

(71) Applicant: William Hampton Switzer, Sr., Atlanta, GA (US)

(72) Inventor: William Hampton Switzer, Sr., Atlanta, GA (US)

(73) Assignee: William Hampton Switzer, Sr., Atlanta, GA (US)

( * ) Notice: Subject to any disclaimer, the term of this patent is extended or adjusted under 35 U.S.C. 154(b) by 0 days.

(21) Appl. No.: 15/345,089

(22) Filed: Nov. 7, 2016

(65) Prior Publication Data
US 2017/0132736 A1     May 11, 2017

Related U.S. Application Data

(60) Provisional application No. 62/252,089, filed on Nov. 6, 2015.

(51) Int. Cl.
*G06Q 50/26* (2012.01)
*G06Q 50/18* (2012.01)
*G06Q 10/10* (2012.01)

(52) U.S. Cl.
CPC ............. *G06Q 50/26* (2013.01); *G06Q 10/10* (2013.01); *G06Q 50/186* (2013.01)

(58) Field of Classification Search
CPC ...... G06Q 50/00; G06Q 50/26; G06Q 50/186; G06Q 10/10
See application file for complete search history.

(56) References Cited

U.S. PATENT DOCUMENTS 5,651,117 A * 7/1997 Arbuckle ............... G06Q 30/06
                                                                    705/4
6,411,939 B1 * 6/2002 Parsons .............. G06Q 10/0635
                                                                    705/35
(Continued)

FOREIGN PATENT DOCUMENTS

CN        101925919 A   * 12/2010   ........... G06Q 10/087
CN        102713960 A   * 10/2012
FR          3002183 A1  *  8/2014   .............. B41M 3/14

OTHER PUBLICATIONS http://personalawgroup.com/proof-of-death-versus-death-certificate-whats-the-difference-and-who-can-get-one/ Personal Law Group Mar. 21, 2019 (Year: 2019).*

(Continued)

*Primary Examiner* — Tan D Nguyen
(74) *Attorney, Agent, or Firm* — Morris, Manning & Martin, LLP; Bryan D. Stewart; Adam J. Thompson (57) ABSTRACT

A deceased notification system utilizing hub and spoke architecture to facilitate notifications to multiple organizations. By having all disparate and disjointed company deceased notification processes and their corresponding required documentation self-contained in one system, the invention provides a means for those settling estates to utilize a "hub and spoke" model to provide deceased notifications, whereby they register someone's death at the hub, and have the system proactively push deceased notifications to all pertinent organizations at the earliest time. This will save all parties time, provide quicker notifications to prevent deceased identity theft, as well as the stoppage of charges for services that are no longer needed, by the decedent.

18 Claims, 3 Drawing Sheets

(56) References Cited

U.S. PATENT DOCUMENTS

| | | | | |
|---|---|---|---|---|
| 7,856,361 | B1* | 12/2010 | Bell | G06Q 10/10 705/2 |
| 2007/0038483 | A1* | 2/2007 | Wood | G06Q 40/08 705/4 |
| 2007/0061424 | A1* | 3/2007 | Mattaway | G06Q 30/00 709/219 |
| 2012/0047055 | A1* | 2/2012 | Aiello | G06Q 40/00 705/35 |
| 2012/0116951 | A1* | 5/2012 | Chung | G06Q 40/025 705/38 |
| 2014/0222716 | A1* | 8/2014 | Joplin | G06Q 10/063 705/36 R |
| 2014/0359291 | A1* | 12/2014 | Wilson | G06Q 10/10 713/168 |
| 2015/0242814 | A1* | 8/2015 | Saad | G06Q 10/107 705/312 |

OTHER PUBLICATIONS https://www.sciencecare.com/death-certificate-need-one/ Science Care Mar. 21, 2019 (Year: 2019).* https://blog.vitalchek.com/death-certificates/death-certificates-necessary/ VitalCheck Mar. 21, 2019 (Year: 2019).*

NPL Proof of Death versus Death Certificate? What's the difference and who can get one? http://personalawgroup.com/proof-of-death-versus-death-certificate-whats-the-difference-and-who-can-get-one/ Author—Persona Law Group May 5, 2010 (Year: 2010).*

NPL What is a Death Certificate and why do you need one? https://www.sciencecare.com/death-certificate-need-one/ Author—Science Care Dec. 13, 2016 (Year: 2016).*

Why and When are Death Certificates Necessary https://blog.vitalchek.com/death-certificates/death-certificates-necessary/ Author—Vitalchek Sep. 9, 2014 (Year: 2014).*

Michelle DiGiacomo, "The Business of Death: A Qualitative Study of Financial Concerns of Widowed Older Women", 2015, DiGiacomo et al. BMC Women's Health, pp. 1-10. (Year: 2015).*

\* cited by examiner

DECEASED NOTIFICATION SYSTEM AND METHOD

CROSS-REFERENCE TO RELATED APPLICATION

This application claims the benefit of priority of U.S. provisional application No. 62/252,089, filed Nov. 6, 2015, the contents of which are herein incorporated by reference.

BACKGROUND OF THE INVENTION

The present invention relates to death notifications, and more particularly to systems and methods of providing death notifications to organizations following a person's death.

Deceased notifications are a time consuming and confusing process for people tasked with estate settlement duties. Notification of a death to various organizations are often disjointed and disparate, requiring the person to search for each organization's notification requirements and handle each organization separately. This process can take a lot of time which can provide a window of time for fraud to occur in the name of the deceased (deceased identity theft) as well as monthly charges to accrue for services no longer needed by the decedent.

Currently, deceased notification processes for each organization, and the associated documents required, are disjointed and disparate, resulting in executors researching and notifying each organization individually of someone's death or simply waiting for the death master list to be distributed to companies for updates. Both methods take a great deal of time, due to processes and/or legal documents not being housed in a centralized location, which would allow for proactive, multiple notifications to be sent at one time.

As can be seen, there is a need for an improved decedent notification system. By having all disparate and disjointed company deceased notification processes and their corresponding required documentation self-contained in one system, the invention provides a means for multiple users settling estates to utilize a "hub and spoke" model to provide deceased notifications, whereby they register someone's death at the hub, and have the system proactively push deceased notifications to all pertinent organizations at the earliest time. This will save them time, provide quicker notifications which helps prevent deceased identity theft, as well as assist in the stoppage of charges for services that are no longer needed, i.e., gym memberships, health insurance, etc.

SUMMARY OF THE INVENTION

In one aspect of the present invention a method of providing decedent notification, includes: providing a computing system operatively coupled to a communications network; the computing system comprising a processor, a non-transitory computer readable storage medium, and a display; receiving a death notification requirement for one or more organizations via said communications network; storing the death notification requirements in the non-transitory computer readable storage medium; and automatically creating a death notification based on the death notification requirements for the one or more organizations. In other embodiments, the method may also include receiving decedent identification data via said communications network; transforming the decedent identification data; and automatically creating the death notification based on the decedent identification data. In other embodiments the method may entail receiving an executor identification data via said communications network; storing the executor identification data in the non-transitory computer readable storage medium; and automatically creating a notification based on the organization death notification requirements, the decedent's identification data, and the user's identification data.

Other aspects of the invention include automatically transmitting the death notification to the one or more organizations. The method may also include collecting a decedent legal document, and storing the decedent legal document in a legal document repository. In a preferred embodiment, the method includes automatically transmitting the decedent legal document with the death notification, wherein the decedent legal document is identified by the death notification requirements for the one or more organizations.

Other implementations of the method may include collecting an executor legal document; and storing the executor legal document in the legal document repository. As will be appreciated, the method may automatically transmit the executor legal document with the death notification, where the executor legal document is identified by the death notification requirements for the one or more organizations.

Yet other aspects of the invention provide a system for automatically generating death notifications. The system may include a computer having a processor, and a non-transitory memory; and a computer program product comprising machine-readable program code for causing, when executed, the computer to perform the process steps of: receiving a death notification requirement for one or more organizations via a communications network; storing the death notification requirements in the non-transitory computer readable storage medium; and automatically creating a death notification based on the death notification requirements for the one or more organizations.

The system may receive a decedent identification data via said communications network; transform the decedent identification data; and automatically create the death notification based on the decedent identification data. The system may also be configured to receiving an executor identification data via said communications network; store the executor identification data in the non-transitory computer readable storage medium; and automatically create a notification based on the organization death notification requirements, the decedent's identification data, and the user's identification data. In other embodiments of the invention, the system may automatically transmit the death notification to the one or more organizations.

Other embodiments of the system include collecting a decedent legal document, and storing the decedent legal document in a legal document repository. The system may also be configured to automatically transmit the decedent legal document with the death notification, wherein the decedent legal document is identified by the death notification requirements for the one or more organizations. Likewise, the system may also be configured to collect an executor legal document; and to store the executor legal document in the legal document repository. In preferred embodiments, the system is configured to automatically transmit the executor legal document with the death notification, wherein the executor legal document is identified by the death notification requirements for the one or more organizations.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a "hub and spoke" system and method to proactively notify multiple organizations of a person's death for the purpose of terminating the ability to use a decedent's name and identity to open credit cards, banking accounts, etc. The invention and its resulting product of deceased notifications will also serve as notice to those organizations being notified, to potentially close the deceased's individual's correlating accounts and to stop billing of those correlating accounts, saving the estate expense.

As stated above, deceased notifications are a time consuming and confusing process for people tasked with estate settlement duties. Notification of a death to various organizations are often disjointed and disparate, requiring the person to search for each companies notification requirements and handle each separately. This process can take a significant amount of time, which can provide a window of opportunity for fraud to occur in the name of the deceased (deceased identity theft) as well as monthly charges that may accrue for services no longer needed or received by the decedent. The invention claimed here solves this problem.

Figure 1:
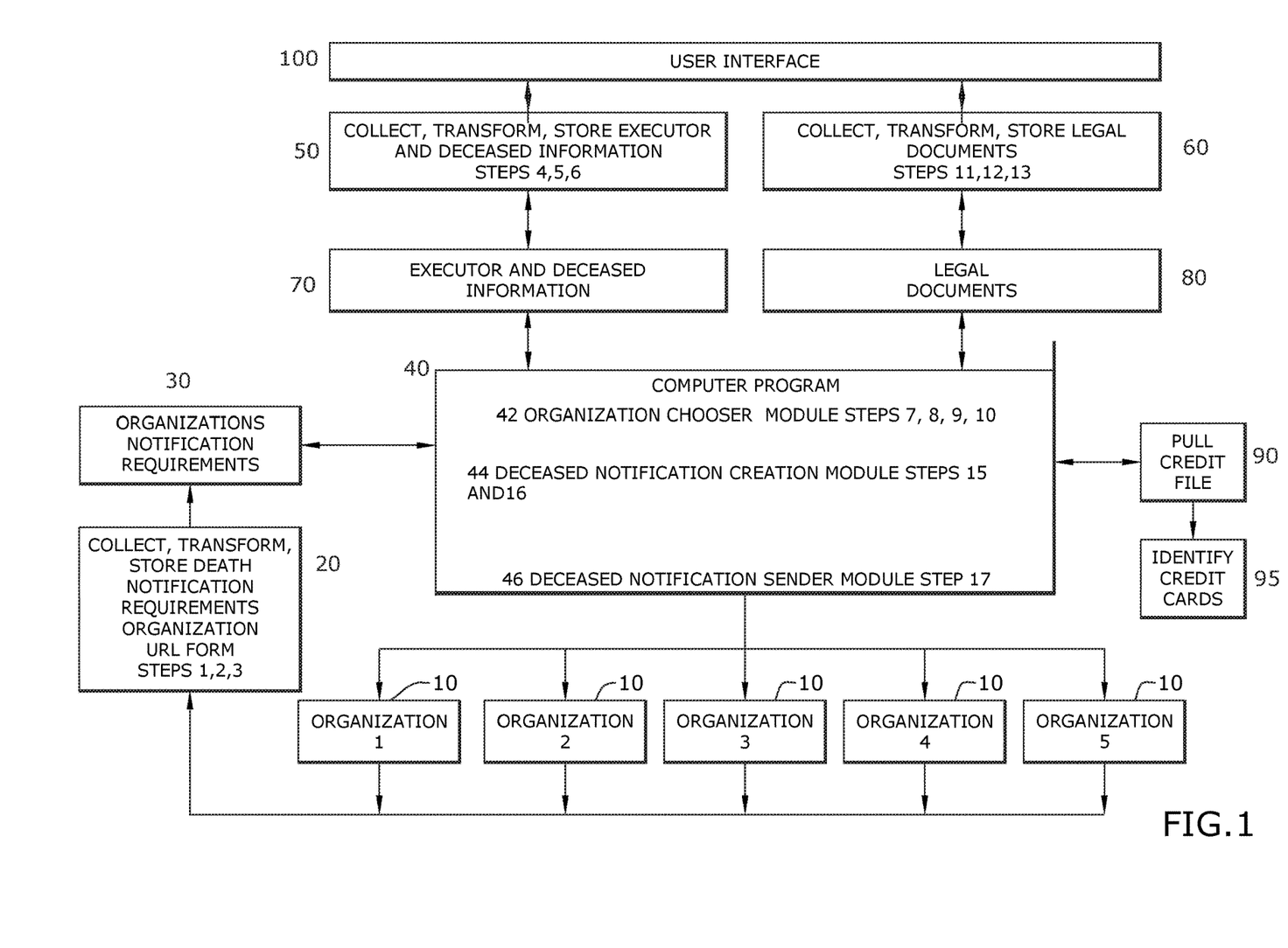
FIG. 1 is a representative system diagram for a deceased notification system.
Figure 2:
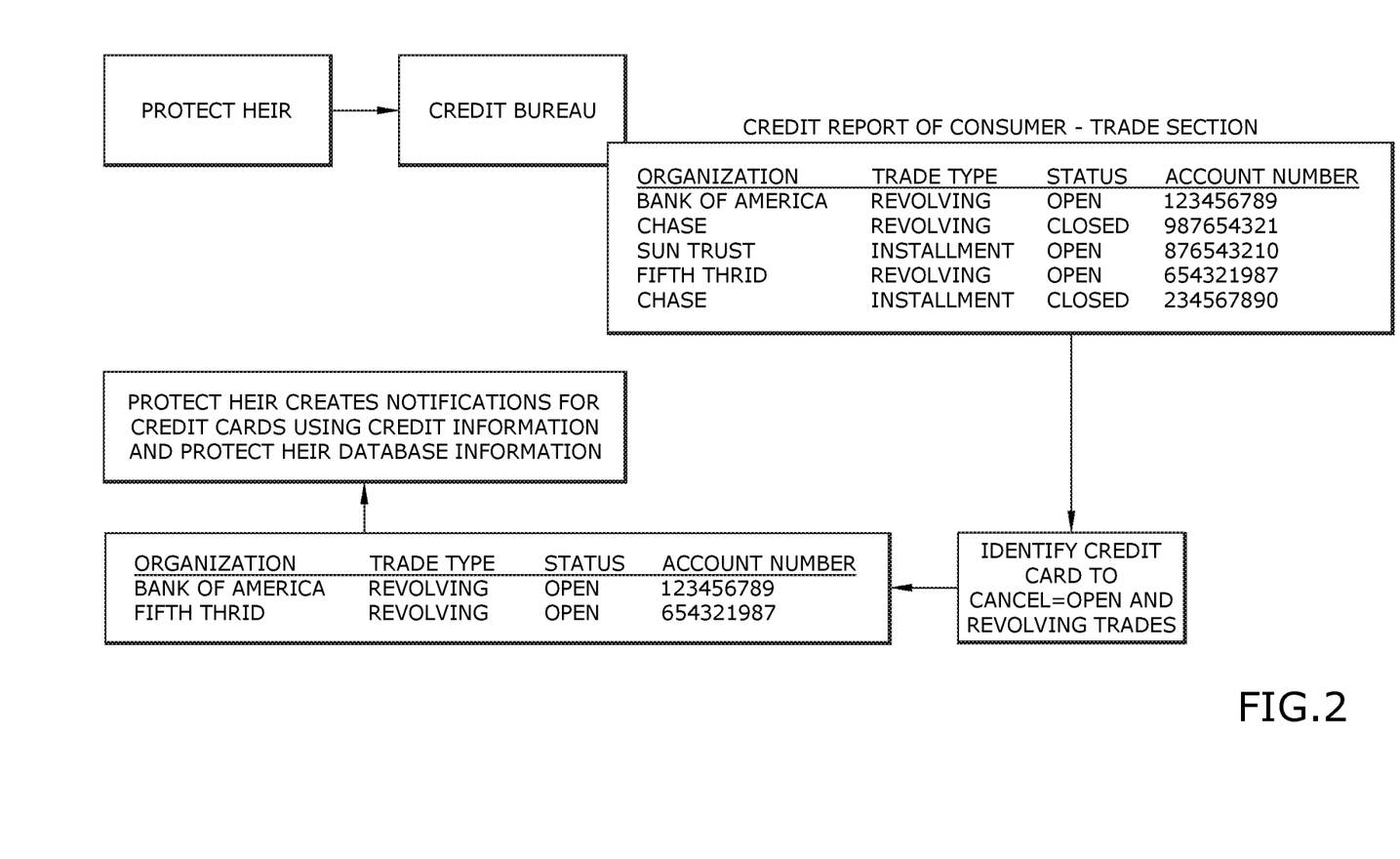
FIG. 2 is a representative flow chart implementing aspects of a deceased notification system.
Figure 3:
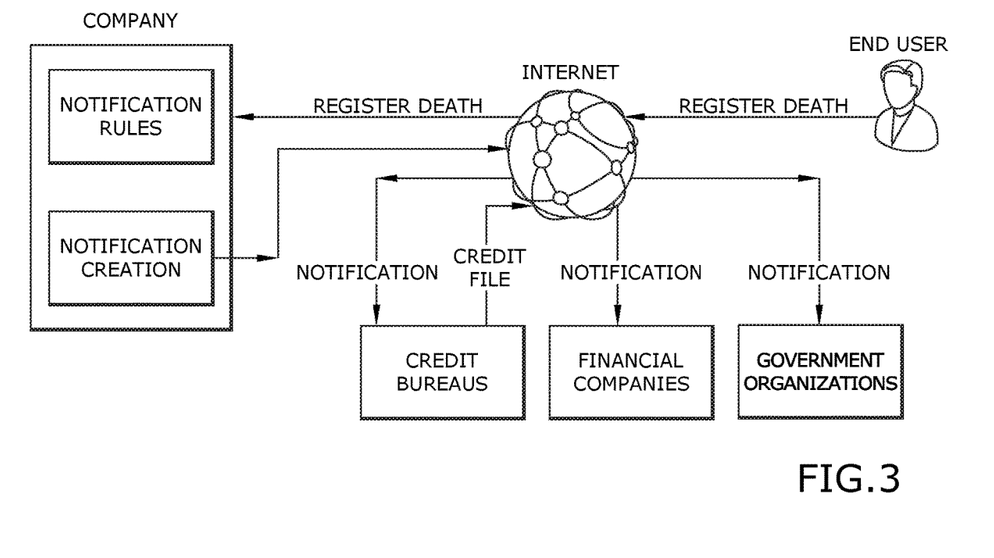
FIG. 3 is a representative system architecture for implementing a direct death notification registration system.
Figure 4:
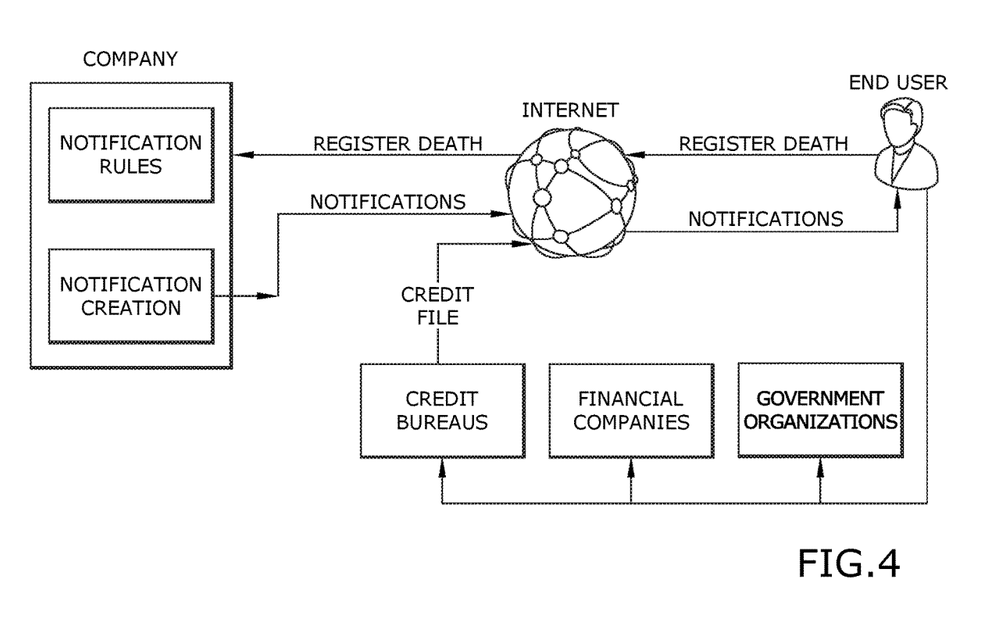
FIG. 4 is a representative system architecture for implementing a death notification registration system implemented through an estate executor.

As seen in reference to FIG. 1, a diagram illustrating an embodiment of the system and method of the present invention. As illustrated, the present invention utilizes a "hub and spoke" architecture for providing deceased notifications, allowing someone, such as an estate's executor or administrator, to register a decedent's death once. The system and method will then generate deceased notifications to one or multiple organizations 10. This is accomplished by two important differentiators; 1) the ability within one system to fully house all pertinent information required to facilitate the creation and transmission of needed deceased notifications and 2) the ability of the system to proactively push deceased notifications to all pertinent organizations 10 at the earliest time versus those organizations waiting on the death master list to update their systems.

A system and method according to the present invention may include one or more of the following steps executed by one or more system modules.

A notification requirements module 20 implements one or more steps of collecting particularized death notification requirements from one or more organizations 10, storing those notification requirements, and transforming and storing those requirements in an organization notification requirements repository 30.

1. Collect Death Notification Requirements from Organizations.

A preliminary step of the system and method of the present invention includes the collection of death notification requirements from one or a plurality of organizations 10. Death Notification Requirements for an organization may include but are not limited to: information to be provided pertaining to deceased; information to be provided pertaining to executor; information needed to match to the decedent's existing accounts; an organization's required legal documents for notification; and transmission method(s) required, which may include; required URL links that may be used for notification.

Organizations from which information may be gathered include but are not limited to: credit reporting agencies; National Marketing Association; credit card companies; U.S. Postal Service; Social Media sites; Internet Service Providers; e-mail providers; utility companies; governmental organizations, such as Department of Motor Vehicles or the Social Security Administration; Insurance Companies; and Health Clubs.

The means of gathering data in step one may include electronic means (e.g., internet submission), physical means (e.g., hard copy submission), auditory means (e.g., verbal submission) or any other means.

2. Store Death Notification Requirements from Organizations.

Storage of an organization's death notification requirements may take any form and may be changed at any time. Data may be stored in electronic form, hard copy form, or any other form. Examples of means of storage include but are not limited to: database; data warehouse; sequential file; markup-language document; loose-leaf paper; electronic media; networked computer systems; and stand-alone computer systems. Storage of data in Step 2 may also be altered numerous times.

3. Transform Death Notification Requirements from Organizations.

Once collected, an organization's death notification requirements are transformed so as to be utilized across the system. Transforming an organization's the death notification requirements may include converting the data from one form to another (e.g., data collected from external web-sites may be transformed to an electronic form residing on an internal web-site). The transformation may also include the addition of a unique organization identifier associated with an organization, and may also include an identification of subsidiaries and affiliates of the organization.

An executor and deceased module 50, provides for the collection, transformation and storage of decedent and executor information. This information may be stored on an executor and deceased information storage module 70.

4. Collect Executor and Decedent Data from System User.

There are many potential system users to provide such data including but not limited to: family members; heirs; estate executors; legal advisors; financial advisors; funeral directors; friends; and acquaintances.

The data collected may include, bibliographic and identification data that includes but is not limited to: the decedent's legal name; decedent's social security number; decedent's address; decedent's date of birth; decedent's email address; decedent's previous addresses; decedent's financial account numbers; decedent's credit card numbers; executor's legal name; executor's address; executor's social security number; executor's relationship to the deceased; executor's email address. Collection of data may be done at one time or at varying times in the process.

For example, the system may gather information on the decedent's place of residence first, for the purpose of displaying potential organizations to notify that are site specific (e.g., utility companies), then collect other information at a later point in the process. The means of gathering data in step four may include electronic means (e.g., internet submission) physical means (e.g., hard copy submission), auditory means (e.g., verbal submission) or any other means.

5. Store Executor and Deceased Individual Data Collected from System User.

Storage of data may take any form and may be changed at any time. Data may be stored in electronic form, hard copy form, or any other form. Examples of means of storage 70 include but are not limited to: database; data warehouse; sequential file; markup-language document; loose-leaf paper; electronic media; networked computer systems; and stand-alone computer systems. Storage of data in Step 5 may also be altered numerous times.

6. Transform Executor and Deceased Individual Data Collected from System User.

Transforming the executor and decedent data may include converting the data from one form to another (e.g., data collected in hard copy form may be transformed to an electronic form. It may also include the generation of a unique identifier for the executor and decedent to uniquely correlate data relating to the decedent and executor with other aspects of the invention.

An organizational chooser module 42 may be configured within a main computer program 40. The organizational chooser module 42 may present a choice of participating or affiliated organizations 10. A data collection routine operates to collect data on one or more organizations 10 the user may have selected through the organizational chooser module 42.

7. Display Potential Organizations to Notify to End User.

In some aspects of the invention, a list of potential organizations to notify may be displayed in the GUI to allow the end user an opportunity to choose those organizations they wish the system to notify. This may include a process of applying rules to the data. For example, based on where the decedent lived, a rule for selecting and displaying only those utilities doing business in that location may be applied. The display methods may include but are not limited to: website interface; mobile phone application; email and typewritten. The transmission of the displayed information may include but are not limited to: electronic transmission, email, U.S Mail, courier service and wireless transmission.

8. Collect Data from System User on Organizations to Notify.

After the potential organizations are displayed to the end user, the user may be presented with the opportunity to select those organizations they wish the system to notify. The means of gathering data in step seven may include electronic means (e.g., internet submission) physical means (e.g., hard copy submission), auditory means (e.g., verbal submission) or any other means.

9. Store Data from System User on Organizations to Notify.

Storage of data may take any form and may be changed at any time. Data may be stored in electronic form, hard copy form, or any other form. Examples of means of storage include but are not limited to: a database; a data warehouse; sequential file; markup-language document; loose-leaf paper; electronic media; networked computer systems; and stand-alone computer systems. Storage of data in Step 9 may also be altered numerous times.

10. Transform Data from System User on Organizations to Notify.

Transformation of the data may include converting the data from one form to another (e.g., data collected in hard copy form may be transformed to an electronic form. It may also include the attachment of the unique identifier for the executor and decedent to correlate the selection of organizations to notify to the executor making the selection, which may be beneficial, for example, when there are multiple executor's for a particular decedent or estate.

A legal documents module 60 may be configured for the collection, transformation, and storage of legal documents associated with the death notification system. A legal documents repository 80 may be provided for the storage of legal documents utilized by the system.

11. Collect Legal Documents Needed for Notifications.

In many circumstances, there may be a need to collect certain legal documents in order to provide proper deceased notifications. According to aspects of the invention this step provides a means to gather required legal documents. For example, certain organizations 10 may require documentation to verify the death of an individual as well as verify the authority of the person utilizing the system of the present invention to act on behalf of the deceased to handle the process of deceased notifications. There may also be a need to have the end user sign a terms and conditions legal document. In instances where this is true, this step will facilitate that requirement. Legal documents may include but are not limited to: copy of death certificate; copy of letter of testamentary; certified copy of death certificate; certified letter of testamentary; letter of representation; certified letter of representation; certified letter of administration; copy of letter of administration; limited power of attorney, power of attorney, terms and conditions, copy of decedent's driver's license, and copy of executor's driver's license. The means of gathering legal documents may include electronic means (e.g., secure web upload) or physical means (e.g., hard copy mailing).

12. Store Legal Documents Needed for Notifications.

Storage of data may take any form and may be changed at any time. Data may be stored in electronic form, hard copy form, or any other form. Examples of a legal documents means of storage 80 include but are not limited to: database; data warehouse; sequential file; markup-language document; loose-leaf paper; electronic media; networked computer systems; and stand-alone computer systems. Storage of data may also be altered numerous times.

13. Transform Legal Documents Needed for Notifications.

Transformation of the legal documents data may include converting the data from one form to another e.g., data collected in hard copy form may be transformed to an electronic form. Moreover, documents transformed into electronic form may be further processed by an optical character recognition program, to make them machine searchable for pertinent data.

14. Payment System.

There may be a need to provide a payment system in which end users can pay for a service. Payment methods could include but are not limited to cash; check; credit card; debit cards and bit coins. Transmission of payment may include but are not limited to: on-line payment via website, U.S. Mail, and electronic transfer.

A deceased notification creation module 44 may be configured to gather death notification requirements for one or more organizations 10 and automatically create a death notification for the one or more organizations 10 according to the organization's specified notification requirements.

15. Gather Matching Death Notification Requirements from Organizations.

After a user has selected organizations 10 to notify or they have been identified by pulling a credit report 90, matching rules may be applied to automatically gather those selected organizations' correlating Death Notification Requirements.

Often times, a person may not know of credit card accounts that need to be closed. Assuming permissible purpose under the Federal Credit Reporting Act is available, a credit file can be pulled to determine potential accounts that could be potentially notified for cancellation. Credit cards that need to be cancelled would be identified by looking for open and revolving trades on the credit file.

16. Create Notifications to Organizations.

The system will apply the requirements gathered in Step 15, select Executor and Deceased Individual data elements collected in step 4, select required legal documents collected in step 11. The system will automatically transform the data elements, and create the notification as described by the Death Notification Requirements for that organization 10.

17. Transmit Notifications to Organizations.

A deceased notification sender module is configured to transmit death notifications to one or more organizations 10. Once the death notifications have been created in step 16, the invention will automatically apply the proper transmission requirements for each organization 10 and transmit the deceased notification to that organization 10 according to the organization's specified requirement. Examples of transmission requirements include but are not limited to: U.S. Mail, e-mail, electronic transfer, website submission, direct-link submission, and internet submission.

18. Security.

According to other aspects of the invention, any or all of the steps may be facilitated or protected by security measures. These security measures might include but are not limited to: safes; lock boxes; encryption; passwords; isolated system components; redundant hardware; secure web upload features; or any other means of ensuring security.

There are many steps that can be executed in different orders and sequences. Similarly, individual steps may be executed any number of times. For example, data may be stored before or after it is transmitted. As another example, data may be transformed after it is collected, again before it is stored, and again before it is transmitted. As another example, payment may be taken at any point in the process. However, in a preferred process flow, Step one, Collect Death Notification Requirements from Organizations would be performed for an individual organization before step 2 and step 3 would occur on that same organization. Step 4, Collect Executor and Deceased Individual Data from System User, could be done on a particular individual before step 5 and step 6 would occur on that same individual. Step 8 would occur on an individual transaction before step 9 and step 10 would occur for that individual transaction. Step 11, Collect Legal Documents Needed for Notifications, could occur on an individual transaction before step 12 and step 13 could occur on that transaction. Step 15, can occur anywhere in the process. Step 16, Create Notifications, is best done after Step 1, step 4, step 8, and step 11 are completed. Step 17 is best done after step 16 is completed.

In preferred embodiments of the invention, executor information, deceased information, and organizations' death notification requirements, should all be contained within the system or be accessible by the system. It is also necessary, but not required, that the legal documents reside within the invention or be accessible within the system. Ideally, collecting data on deceased and executor individuals would be done by the web based user interface 100, and stored electronically in one or more repositories 30, 70, 80. This same web based user interface 100 would be used to select organizations 10 to notify and pay for the service. By having all these informational elements reside within one system, the system is able to use rules and requirements to combine data from all data sources to create and send a death notification that matches each organization's required death notification process parameters. Security measures could be used to protect the information at all steps. A payment portal would provide a means to pay for use of the system, if needed.

There are several functions within the system where logic may be used. During data gathering in steps 1, 4, 8, and 11, if information is incomplete, the system will not allow user to continue. In step 7, the system could use logic to determine what organizations to list based on other data provided, such as place of residence for the deceased. In step 15, matching logic is used to select the matching requirements to the organizations selected to notify. In step 16 and step 17, logic is used to select and match all previously collected data elements and legal documents to a defined required notification process also previously collected.

A preferred embodiment of the system provides a web based graphical user interface (GUI) 100 for data input, accessible via computer, tablet, or phone application. The GUI 100 provides a means for a user to input information which is collected and stored in electronic form such as a database. Input information to be collected includes but is not limed to: executor information and decedent information.

Additionally, legal documents may need to be collected via a legal documents module 60, in order to create the required deceased notification. Legal documents would ideally be uploaded into the system via secure web upload and stored in a legal documents repository 80. An additional table or database within the system will include information to be collected pertaining to individual organization's deceased notification process and rules 30. The user interface 100 may utilize a computer program to allow the user of the system to see a display of organizations 10 eligible for notification and allow them to choose those to notify.

A computer program 40 may be used to then take organizations 10 selected and match to the table of organizations and their corresponding deceased notification process and rules, stored within an organization notification requirements repository 30. The system could then use the deceased information/executor information 70 and legal documents 80 repositories to construct a deceased notification that matches the organization's 10 deceased notification requirements 30 and rules. Certain security measures such as encryption, password protection, secure web upload, etc., would be used to protection information. Additionally, a payment portal on this web based application would be utilized if needed. All methods described above may be written in any programming language and may reside on any one or more computer-readable mediums.

There are many steps that may be executed in different orders and individual steps may be executed any number of times. For example, data on executors, deceased, organization's deceased notification requirements, and legal documents may be stored before or after it is transmitted. As another example, data on executors, deceased, organizations to notify, and organizations' deceased notification requirements, may be transformed after it is collected, again before it is stored, and again before it is transmitted. As another example, payment may be taken at any point in the process.

The payment step may occur at any point in the process. The order in which data is collected could also be modified based on, for example, the user's ability to gather information regarding the decedent's estate and relationships with particular organizations.

A user would access the system ideally through a web based user interface 100 which would collect information for use in the system regarding the deceased and executor module 50 (steps 4, 5, and 6) and associated date repository 70; a legal documents module 60 (steps 11, 12, and 13) and its associated repository 80; and organizations the user wishes to notify (steps 7, 8, 9, and 10). The system uses that information entered by the user to create a notification (Steps 15 and 16) for each organization 10 to notify, as specified by that organization's deceased notification requirements (which have been collected and stored previously for use in the system in steps 1, 2, and 3). Then, the system sends the organization's deceased notification (step 17) as specified by that organization's deceased notification requirements (also collected and stored previously for use in the system in steps 1, 2, and 3). A user at some point in the process could potentially pay for use of the system (step 14).

More encompassing systems, which help with executor functions and provide executor help, could utilize the system as part of an overall system. Another example would be funeral software which could utilize this system as an adjunct with their overall system. A database of deceased individuals and executor individuals could be of value for other organizations and that information could be sold for informational purposes. For example, a company doing direct mail might be interested in using the collected information to remove the deceased names from mailing. As another example, executor information might be of use to wealth management organizations looking to set up accounts in the name of the estate.

It is further contemplated that the present invention may be run on a computer system, or may be run from a server or cloud based computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method of providing notification of a decedent's passing to a subset of a plurality of organizations to reduce an incidence of decedent identity theft and fraud comprising:
    providing a computing system operatively coupled to a communications network, the computing system comprising a processor, a non-transitory computer readable storage medium, and a display;
    collecting by the computing system, on an ongoing basis, a particularized death notification requirement from the plurality of organizations, the particularized death notification requirement having a specification, established by each of the plurality of organizations, the specification specifying one or more of information pertaining to each of the decedent and an executor, a required legal document, a content, a format, and a transmission method, for a death notification for each of the plurality of organizations, the death notification informing the plurality of organizations of the decedent's passing according to the specification established by each of the plurality of organizations;
    storing the particularized death notification requirement in the non-transitory computer readable storage medium;
    receiving a decedent's identification data from the executor prior to a publication of the decedent's passing in a death master file;
    responsive to receiving the decedent's identification data, requesting a credit file for the decedent from a credit bureau;
    pulling the credit file comprising at least one account comprising one of: an open and a revolving transaction account for the decedent from the credit bureau via said communications network;

identifying at least one credit file sourced organization corresponding to the at least one account from the credit file for the decedent;

matching, via at least one matching rule, individual ones of the at least one credit file sourced organization with a respective one of the plurality of organizations stored in the non-transitory computer readable storage medium, wherein a subset of the plurality of organizations comprises the matched respective ones of the plurality of organizations;

creating the death notification by transforming the decedent's identification data and the particularized death notification requirement into the death notification for each of the subset of the plurality of organizations to notify according to the specification for the death notification of each of the subset of the plurality of organizations;

receiving a selection from the executor, the selection indicating selected ones of the subset of the plurality of organizations to notify of the decedent's passing from said credit file; and transmitting the death notification, by the computing system, to the selected ones of the subset of the plurality of organizations according to the particularized death notification requirement specified for each of the subset of the plurality of organizations before the decedent's passing is reported on the death master file to reduce the incidence of decedent identity theft and fraud.

2. The method of claim 1, further comprising:
receiving an executor identification data via said communications network;
storing the executor identification data in the non-transitory computer readable storage medium; and
automatically creating a notification based on the particularized death notification requirement, the decedent's identification data, and the executor identification data.

3. The method of claim 2, further comprising: automatically transmitting the death notification to the subset of the plurality of organizations in response to receiving the selection by the executor.

4. The method of claim 3, further comprising:
collecting a decedent legal document, and
storing the decedent legal document in a legal document repository.

5. The method of claim 4, further comprising:
automatically transmitting the decedent legal document with the death notification, wherein the decedent legal document is identified by the particularized death notification requirement for the subset of the plurality of organizations.

6. The method of claim 4, further comprising:
collecting an executor legal document; and storing the executor legal document in the legal document repository.

7. The method of claim 6, further comprising:
automatically transmitting the executor legal document with the death notification, wherein the executor legal document is identified by the particularized death notification requirement for the subset of the plurality of organizations.

8. The method of claim 1, further comprising: proactively notify the subset of the plurality of organizations of the decedent's passing prior to the publication of the decedent's passing in the death master file to terminate an ability to use a decedent's identity data to open a financial account.

9. The method of claim 8, further comprising: wherein the decedent's identification data is received from the executor based on a receipt of a death certificate for the decedent by the computing system.

10. The method of claim 1, further comprising: identifying one or more correlating accounts; and notifying the subset of the plurality of organizations holding the one or more correlating accounts to terminate the one or more correlating accounts.

11. A method of providing notification of a decedent's passing to a subset of a plurality of organizations to reduce an incidence of decedent identity theft and fraud comprising:
providing a computing system operatively coupled to a communications network, the computing system comprising a processor, a non-transitory computer readable storage medium, and a display;

collecting, by the computing system, on an ongoing basis, a particularized death notification requirement from the plurality of organizations, the particularized death notification requirement having a specification, established by each of the plurality of organizations, the specification specifying one or more of information pertaining to each of the decedent and an executor, a required legal document, a content, a format, and a transmission method, for a death notification for each of the plurality of organizations, the death notification informing the plurality of organizations of the decedent's passing according to the specification established by each of the plurality of organizations;

storing the particularized death notification requirement in the non-transitory computer readable storage medium;

receiving a decedent's identification data from the executor prior to a publication of the decedent's passing in a death master file;

responsive to receiving the decedent's identification data, requesting a credit file for the decedent from a credit bureau;

pulling the credit file comprising at least one account comprising one of: an open and a revolving transaction account for the decedent from the credit bureau via said communications network;

identifying at least one credit file sourced organization corresponding to the at least one account from the credit file for the decedent;

matching, via at least one matching rule, individual ones of the at least one credit file sourced organization with a respective one of the plurality of organizations stored in the non-transitory computer readable storage medium, wherein a subset of the plurality of organizations comprises the matched respective ones of the plurality of organizations;

creating the death notification by transforming the decedent's identification data and the particularized death notification requirement into the death notification for each of the subset of the plurality of organizations to notify according to the specification for the death notification of each of the subset of the plurality of organizations;

receiving a selection from the executor, the selection indicating selected ones of the subset of the plurality of organizations to notify of the decedent's passing from said credit file;

transmitting the death notification, by the computing system, to the selected ones of the subset of the plurality of organizations according to the particularized death notification requirement specified for each of the selected ones of the subset of the plurality of organizations before the decedent's passing is reported on the death master file to reduce the incidence of decedent identity theft and fraud, wherein the death notification proactively notifies the one or more organizations of the decedent's passing prior to the publication of the decedent's passing in the death master file to terminate an ability to use a decedent's identity data to open a financial account;

identifying one or more correlating accounts; and notifying the one or more organizations holding the one or more correlating accounts to terminate the one or more correlating accounts, wherein the decedent's identification data is received from the executor based on a receipt of a death certificate for the decedent by the computing system.

12. A system for automatically generating a death notification to a subset of a plurality of organizations identified from a credit file for a decedent to reduce an incidence of decedent identity theft and fraud comprising:

a computer having a processor, and a non-transitory memory; and a computer program product comprising machine-readable program code for causing, when executed, the computer to perform the following process steps:

collecting on an ongoing basis a particularized death notification requirement specifying one or more of a content, a format, or a delivery means of a death notification for each of the plurality of organizations via a communications network, the death notification providing the plurality of organizations a notice of the decedent's passing according to the particularized death notification requirement specified for each of the plurality of organizations;

storing the particularized death notification requirement in the non-transitory memory;

receiving a decedent's identification data from an executor via said communications network prior to a publication of the decedent's passing in a death master file;

transmitting, by the computer, a request for a credit file for the decedent to a credit bureau prior to the publication of the decedent's passing in the death master file, the request including the death notification to the credit bureau;

pulling the credit file comprising at least one account comprising one of: an open and a revolving transaction account for the decedent from the credit bureau via said communications network;

receiving, from the executor, a selection of at least one credit file sourced organization corresponding to the at least one account identified in the credit file for the decedent;

matching, via at least one matching rule, individual ones of the at least one credit file sourced organization with a respective one of the plurality of organizations stored in the non-transitory memory, wherein a subset of the plurality of organizations comprises the matched respective ones of the plurality of organizations;

transforming the decedent's identification data and the particularized death notification requirement into the death notification according to the specification of each of the subset of the plurality of organizations; and transmitting the death notification, by the computer, to each of the subset of the plurality of organizations matched to the executor's selected at least one credit file sourced organization according to the particularized death notification requirement specified for each of the subset of the plurality of organizations before the decedent's passing is reported on the death master file to reduce the incidence of decedent identity theft and fraud.

13. The system of claim 12, further comprising:

receiving an executor identification data via said communications network; storing the executor identification data in the non-transitory memory; and automatically creating the death notification based on the particularized death notification requirement, the decedent's identification data, and the executor identification data.

14. The system of claim 13, further comprising:

automatically transmitting the death notification to the subset of the plurality of organizations, in response to matching the at least one credit file sourced organization with the subset of the plurality of organizations to notify.

15. The system of claim 14, further comprising: collecting a decedent legal document, and storing the decedent legal document in a legal document repository.

16. The system of claim 15, further comprising: automatically transmitting the decedent legal document with the death notification, wherein the decedent legal document is identified by the particularized death notification requirement for each of the subset of the plurality of organizations.

17. The system of claim 16, further comprising: collecting an executor legal document; and storing the executor legal document in the legal document repository.

18. The system of claim 17, further comprising:

automatically transmitting the executor legal document with the death notification, wherein the executor legal document is identified by the particularized death notification requirement for the subset of the plurality of organizations.

* * * * *